UNITED STATES PATENT OFFICE.

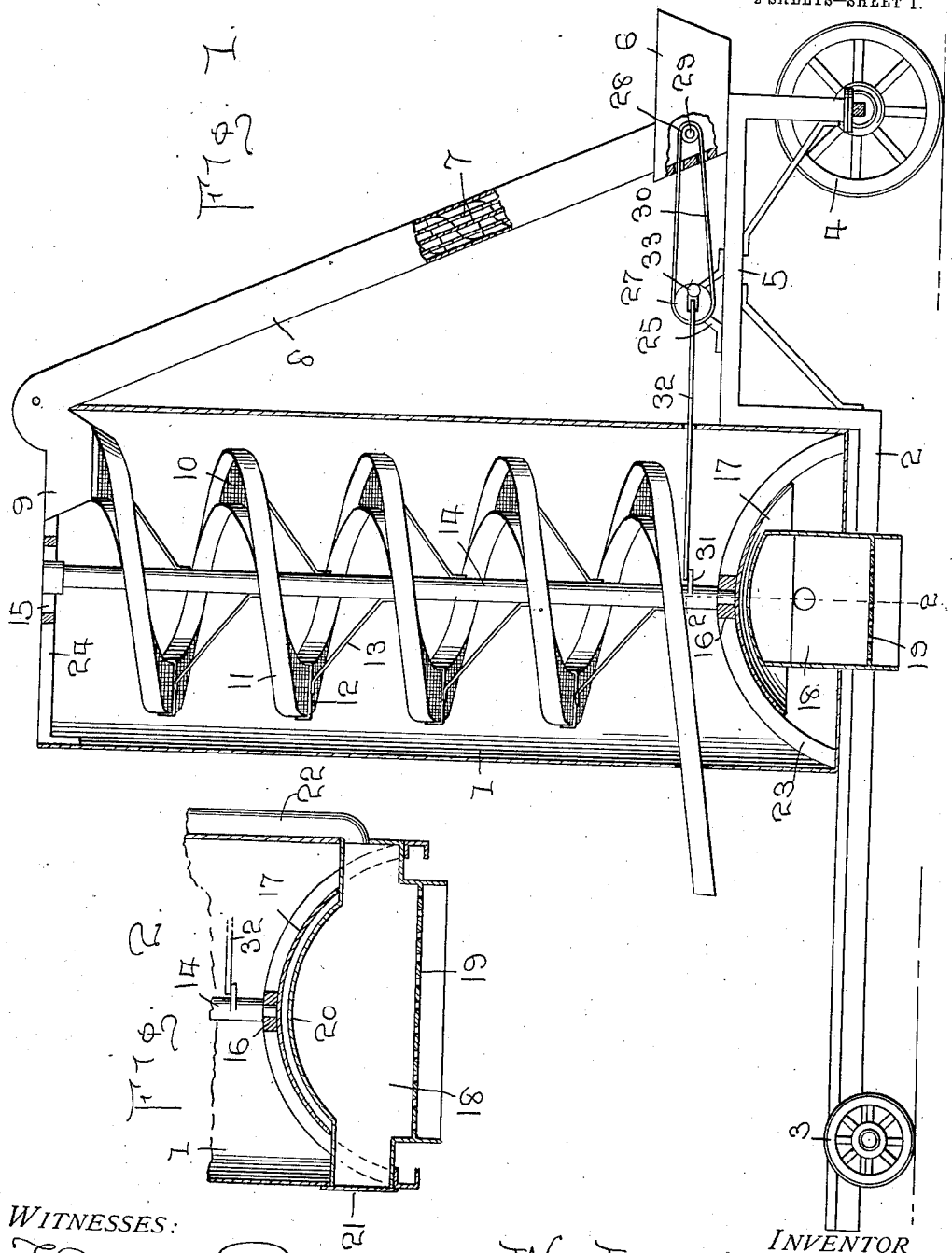

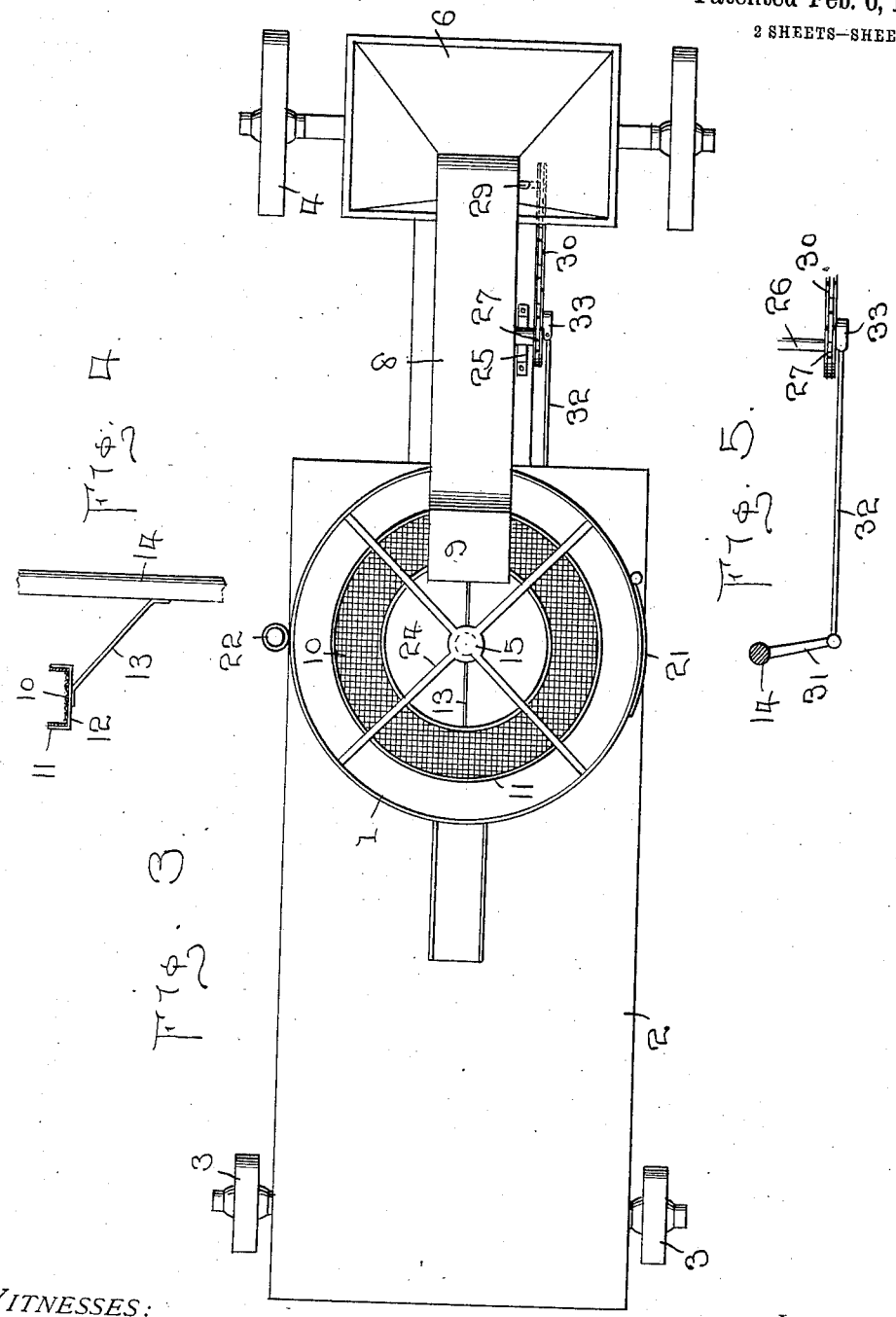

WILLIAM LANDES, OF CANTON, KANSAS.

DRIER.

1,016,568.      Specification of Letters Patent.      Patented Feb. 6, 1912.

Application filed August 17, 1911. Serial No. 644,540.

*To all whom it may concern:*

Be it known that I, WILLIAM LANDES, a citizen of the United States, residing at Canton, in the county of McPherson and State of Kansas, have invented certain new and useful Improvements in Driers; and I do hereby declare the following to be a full, clear, and exact description of the invention, such as will enable others skilled in the art to which it appertains to make and use the same.

This invention relates to driers and more particularly to alfalfa driers.

An object of the invention is to construct an alfalfa drier which will effectively dry out the alfalfa in any season of the year.

Another object is to construct an alfalfa drier in connection with which may be employed any form of heater.

Another object is to produce an alfalfa drier having a continuous or spiral sieve and mechanism for rocking or oscillating the sieve.

Another object is to build an alfalfa drier comprising a cylinder with a pipe or central post mounted therein, and a spiral sieve around the central post and spaced therefrom, in connection with an elevator for delivering the alfalfa to the upper end of the sieve and means for oscillating the sieve to cause the alfalfa to travel downwardly upon the sieve and means for heating the alfalfa during its travel upon the sieve, and, another object is to construct a drier of this kind, positioned upon a truck to facilitate ready transportation from one field to another.

Other objects and advantages will be hereinafter set forth and pointed out in the specification and claims.

In the accompanying drawings which are made a part of this application, Figure 1 is a side elevation of the complete drier, parts being shown in section. Fig. 2 is a sectional view on the line 2—2 of Fig. 1. Fig. 3 is a top plan view. Fig. 4 is a fragmentary view, showing the form of bracket employed for supporting the sieve, and, Fig. 5 is a detail view of the pitman and connections for oscillating the sieve.

Referring to the drawings in which similar reference numerals designate corresponding parts throughout the several views, 1 represents the cylinder which is preferably formed of metal, but may be of any material desired. The cylinder 1 is preferably closed at the lower end and mounted upon a truck platform 2 having wheels 3 and 4 upon suitable axles at the front and rear ends, respectively, thereof. The truck platform 2 is preferably raised at its rear end, as shown at 5, and has mounted upon this end a trough 6 within which the lower end of an elevator 7 is positioned.

The elevator 7 is positioned at an angle and the upper end thereof rests upon the upper edge of the cylinder 1. The elevator 7 may be of any type desired, but is illustrated as a bucket elevator, comprising an endless chain with buckets mounted thereon. At the mouth of the upper end of the elevator, or rather the mouth of the casing 8 thereof, is a discharge hopper 9.

Within the casing 1 is the spiral screen 10, the bottom of which is perforated or formed of wire mesh having the solid flanges 11 extending upwardly from the edges thereof. The screen 10 is positioned a spaced distance inwardly of the inner surface of the cylinder 1 and is supported by means of the U-shaped brackets 12 to which are connected the arms 13 having their lower ends fastened to a vertical central post or hollow pipe 14. The upper end of the screen 10 is positioned directly beneath the hopper 9, from which the alfalfa brought thereto by the elevator 7, falls into the screen 10. The lower end of the screen 10 projects through a suitable opening in the side of the cylinder 1, near the lower end of said cylinder, but a short distance above the truck platform 2.

It will be understood that the screen 10 is spaced a suitable distance around the central post 14, which has its upper end mounted for rotation in the cross brace 15, extending across the upper end of the cylinder 1. The lower end of the central post or pipe 14 is similarly mounted in the center of the curved arch 16 at the lower end of the cylinder 1.

Directly beneath the arch 16 is a heat deflector 17 beneath which is the heat compartment 18 having a perforated bottom 19. The compartment 18 is preferably of substantially rectangular form having the central portion of its top curved, as shown at 20, which portion 20 is beneath the deflector 17. The grate or perforated bottom 19 may, if desired, be some distance below the bottom of the cylinder 1. One end of the compartment 18 may be provided with a door 21, through which wood or other like material may be inserted when such material is to be employed for heating the alfalfa to dry the latter, while upon the screen 10. At the opposite end of the compartment 18 is connected the lower turned end of a smoke discharge pipe 22, which extends upwardly against the cylinder 1 to allow the escape of smoke from the compartment 18. It will be apparent that an oil or gas burner or lamp may be placed within the compartment 18 to heat the walls thereof and thus warm the air within the cylinder 1 to dry the alfalfa upon the screen 10. The arch 16 and the cross brace 15 may be strengthened by similar arches 23 and cross bars 24, respectively, if desired, the strengthening arches 23 and cross bars 24 crossing or being secured to the arch 16 and cross bar 15, in any preferred manner.

Positioned upon the raised portion 5 of the truck are bearing brackets 25, within which is mounted a shaft 26 having a belt wheel 27 carried thereon, at one end. Passing around the belt wheel 27 and around a similar wheel 28 upon the lower shaft 29 of the elevator 7, is a belt 30 which transmits power to the elevator to operate the latter, as will be clearly understood. If desired, the belt wheels 27 and 28 and the belt 20 may be substituted by sprocket wheels and a sprocket chain.

Connected to an ear or lug 31 projecting outwardly from the central post 14, near the lower end thereof, is a pitman arm 32, which has one end connected with a pin 33 near the edge of the wheel 27 to oscillate the screen 10 by rocking or rotating the central post 14 for a short distance in either direction, thus causing the brackets 12 upon which the screen 10 rests to move the latter in first one direction and then the other, as will be clearly understood. It will also be understood that the pitman rod 32 works through a suitable opening in the side of the cylinder 1.

In operation the alfalfa, after being cut in suitable lengths, is placed within the trough 6 and the shaft 26 rotated by an engine upon the platform 5, or by other suitable means for operating the shaft 26 (not shown). The elevator 7 will carry the alfalfa to the trough 9, from which it will drop upon the upper end of the spiral sieve 10. The sieve 10 being continually oscillated by means of the pitman rod 32, as previously described, will cause the alfalfa to move slowly along the sieve and slide off of the lower end thereof projecting through the casing 1. The heat caused by the fuel or burner within the compartment 18 heating the sides of the latter, will rise from around the edges of the deflector 17 and warm the air upon all sides of the sieve 10 and the air passing through the sieve 10, thus drying the alfalfa as it descends upon said sieve.

It is very important that a space be left between the central post 14 and the sieve 10 and also between the outer edge of the sieve 10 and the wall or inner surface of the cylinder 1, to allow free and thorough circulation of the warm air around and above the alfalfa to thoroughly dry the latter. Owing to the fact that I have mounted the drier upon a specially constructed truck, the device may be readily transported from one place to another, as from field to field.

It will be evident that this drier will be thorough and effective in the performance of its duty and may be operated at a small cost.

Any form of lamp or burner may be employed for heating the air within the cylinder 1, or wood, straw, or the like may be placed upon or below the perforated bottom or grate 19 of the cylinder 18 for drying the alfalfa, as will be understood.

Owing to the comparatively small number of parts included in this apparatus and the simple formation and connection of said parts, there is practically no danger of the operative parts getting out of order. However, should such an accident occur or should any of the parts become worn or broken they may be readily replaced at a small cost.

What I claim is:

1. A drying apparatus comprising a cylinder, a central post within the cylinder, brackets extending from the central post, a spiral sieve resting upon the brackets outwardly of the central post and a spaced distance from the inner wall of the cylinder, means for dropping the material to be dried upon the sieve, means for warming the air within the cylinder, and means for rocking the central post in opposite directions to oscillate the sieve with the material thereupon.

2. A drying apparatus comprising a cylinder having a closed lower end and an open upper end, a central post within the cylinder, said post being mounted for rotation in opposite directions, a sieve within the cylinder, means carried by the post for supporting the sieve outwardly of said post and inwardly of the inner wall of the cylinder, means carried by the cylinder for supporting the opposite ends of the post, means for delivering material to be dried upon the sieve, means for rotating the post in opposite directions to oscillate the sieve, means for heating the material delivered upon the sieve, and means for operating the material delivering means.

3. A drier comprising a cylinder, a shaft within the cylinder, a heat compartment at the lower end of the cylinder, a spiral sieve within the cylinder, said sieve being supported around the shaft, a deflector below the sieve and above the heat compartment for deflecting and distributing the heat emanating from the heat compartment, an elevator for delivering material to be dried upon the upper end of the sieve, means for supporting the cylinder and the elevator for transportation, and means for operating the elevator and rotating the shaft in opposite directions to oscillate the sieve and cause the material thereon to move downwardly to the lower end of said sieve.

In testimony whereof I have signed my name to this specification in the presence of two subscribing witnesses.

WILLIAM LANDES.

Witnesses:
 JAMES D. S. MIDDLESWART,
 FRED M. BARNUM.

Copies of this patent may be obtained for five cents each, by addressing the "Commissioner of Patents, Washington, D. C."